March 14, 1961     R. G. LEITNER ET AL     2,975,235
TELESCRIBING APPARATUS Filed Oct. 17, 1955     3 Sheets-Sheet 1

FIG. 1.

INVENTORS
RICHARD G. LEITNER
JAMES A. MAIZE
BY
Ellsworth R. Roston
ATTORNEY March 14, 1961    R. G. LEITNER ET AL    2,975,235
TELESCRIBING APPARATUS Filed Oct. 17, 1955    3 Sheets-Sheet 3

INVENTORS
RICHARD G. LEITNER
JAMES A. MAIZE
BY Ellsworth R. Roston
ATTORNEY

United States Patent Office 2,975,235
Patented Mar. 14, 1961

2,975,235

TELESCRIBING APPARATUS

Richard G. Leitner, Los Angeles, and James A. Maize, Whittier, Calif., assignors to Telautograph Corporation, Los Angeles, Calif., a corporation of Virginia Filed Oct. 17, 1955, Ser. No. 540,681

11 Claims. (Cl. 178—18)

This invention relates to telescribing apparatus and more particularly to apparatus for recording at a first station the movements of a stylus at a second station.

With increases in the sizes of industrial plants and business operations such as banks, communications within the plants and business operations are providing an increasing problem. The use of the telephone is, of course, of considerable benefit in many instances. Sometimes, however, the use of the telephone is not completely advantageous. For example, in an industrial plant, the general manager may want to transmit a message over his signature to all of the workers in the plant. As another example, the signature of a depositor in a bank may have to be verified when the depositor is withdrawing money from his account, especially if the withdrawal relates to a large amount. Such verification has to be fast so as not to exhaust the patience of the depositor.

Telescribing units have been built for providing a communication between different parts of an industrial plant or business operation. Such telescribing units include at least one telescribing station and one or more receiving stations. A stylus is moved as by hand at the transmitting station in accordance with a message to be transmitted. Signals are produced with characteristics representing the position of the stylus at any instant. These signals are transmitted to the receiving stations and are operative upon components at the receiving station for moving styluses through distances related to the movements of the transmitting stylus. In this way, messages are recorded automatically at the different receiving stations.

One of the problems in previous systems has resulted from the need for using at the transmitting station a stylus with a plurality of linkages for translating the movement of the stylus into corresponding electrical signals. The problem of providing signals representing the position of the stylus at any instant has also been troublesome. This has resulted from the fact that the position of the stylus has been determined by its displacement along two transverse axes. At the receiving station, the signals representing the displacement of the stylus along one axis have had to be distinguished from the signals representing the displacement of the stylus along the second axis. This delineation of signals has been previously accomplished by the use of somewhat complex equipment.

This invention provides telescribing apparatus which overcomes the above disadvantages. The invention includes a stylus which requires no linkages to translate the movements of the stylus into corresponding electrical signals. The electrical signals are instead produced by using a flexible diaphragm having a conductive face disposed in contiguous relationship to a pair of transverse resistance members. When the stylus is pressed against the diaphragm, it produces a contact between the conductive layer and the resistance members at a position corresponding to the stylus position.

Voltages are alternately applied across the resistance members such that proportionate voltages are produced at the position of contact between the resistance members and the conductive layer on the diaphragm. These output voltages have amplitudes corresponding to the distance of the position of contact from the ends of the resistance members. The voltages are transmitted on a time-sharing basis to each receiving station and are co-ordinated at the receiver in a manner to provide a simple delineation between the signals representing stylus displacements along the first and second axes. The voltages are compared with voltages representing the position of the stylus at the receiving station such that error signals are produced representing any difference in the amplitudes of the output and comparison voltages. The error signals are introduced to motors which drive the stylus at the receiving station in directions for reducing the amplitudes of the error signals. In this way, servo loops are obtained for controlling the positioning of the stylus at the receiving station.

Apparatus is also included for preventing the recordation of any marks at the receiving station when the receiving stylus is not accurately following the movements of the transmitting stylus within particular limits. The apparatus accomplishes this by using in a particular manner the signals generated in the servo loops. This is especially important when a message is starting to be transcribed since the receiving stylus may be initially positioned at a considerable distance from the position at which the transmitting stylus is first made to contact the paper. In this way, the receiving stylus cannot record any initial movements which it has to make in order to reach the position of the transmitting stylus.

An object of this invention is to provide a telescribing system in which a stylus at a transmitting station is able to control the positionings of styluses at receiving stations without any need for a linkage system in association with the stylus at the transmitting station.

Another object is to provide a telescribing system in which a flexible diaphragm and a pair of resistance members are associated with the stylus to produce signals upon the exertion of pressure against the stylus and in accordance with the disposition of the stylus relative to the diaphragm.

A further object is to provide apparatus for producing a pair of voltages on an alternate basis such that one voltage has an amplitude representing the disposition of the stylus in a first direction and the other voltage has an amplitude representing the disposition of the stylus in a second direction transverse to the first direction.

Still another object is to provide a plurality of receiving stations each of which is synchronized in operation with a pair of voltages produced on a time-sharing basis at the transmitting station to obtain movements of a stylus at each receiving station in accordance with the movements of the stylus at the transmitting station.

A still further object is to provide a telescribing system in which servo techniques are used at the receiving stations to obtain movements of the receiving stylus accurately corresponding to the movements of the transmitting stylus.

Another object is to provide a telescribing system in which a stylus at a receiving station cannot record its movements unless it is accurately following the movements of a stylus at a transmitting station within particular limits.

Other objects and advantages will be apparent from a detailed description of the invention and from the appended drawings and claims.

In the embodiment of the invention shown in the drawings, a flexible diaphragm 10 (Figures 2 and 3) is provided. The diaphragm 10 may be made from a thin sheet of a suitably resilient material such as that designated as "Mylar" by E. I. du Pont de Nemours and Company of Wilmington, Delaware. This material is advantageous because of its properties of great resiliency and strength and high electrical insulation. The diaphragm is adapted to support a thin sheet of paper 11 on its upper surface. The diaphragm 10 is coated on its under surface with a thin layer 12 of conductive material such as copper. The diaphragm 10 is supported by clamps 14 in a taut relationship for reasons which will be described in detail subsequently. A stylus 15 preferably having a relatively sharp point is associated with the diaphragm 10 to apply pressure to the diaphragm.

Figure 2:
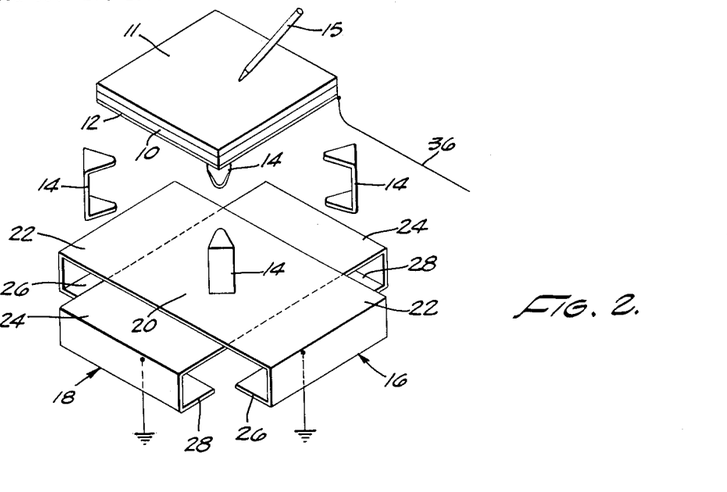
Figure 2 is an exploded perspective view somewhat schematically illustrating the construction and relative disposition of certain members included in the invention, some of these members also being shown in Figure 1.
Figure 3:
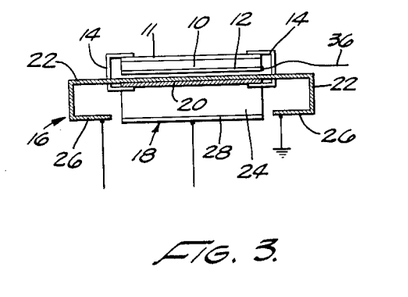
Figure 3 is a sectional view of the members shown in Figure 2 in the assembled relationship of these members to illustrate the construction of these members in further detail.

A pair of resistance members generally indicated at 16 and 18 are disposed below the diaphragm 10 in substantially parallel and contiguous relationship to the diaphragm. The resistance members may be made from a suitable material such as a nickel silver composition or they may be made from an insulating material such as cardboard coated with a suitable material such as graphite particles. Such materials are desirable so as to provide a high resistivity per unit of length. The resistance members 16 and 18 may be provided with a common control portion 20 covering an area corresponding to that occupied by the diaphragm 10. Although separate central portions are shown in Figures 2 and 3 for each of the resistance members 16 and 18, it should be appreciated that both of the resistance members may have a single central portion.

Pairs of leg portions 22 and 24 may extend from the central portion 20 such that the legs in a pair are substantially parallel to each other to form the resistance members 16 and 18. The leg portions 22 are in transverse relationship to the leg portions 24. The leg portions 22 and 24 may have a diagonal relationship corresponding to that formed by a pair of lines extending between diagonally opposite corners of the diaphragm 10. This relationship of the leg portions 22 and 24 would correspond to that disclosed in Patent No. 2,355,-087 issued August 8, 1944, to Wallace A. Lauder et al. The leg portions 22 and 24 may also be in substantially perpendicular relationship when movements are indicated in rectangular co-ordinates.

The leg portions 22 and 24 are preferably folded under themselves as respectively indicated at 26 and 28 so as to increase the effective lengths of the resistance members 16 and 18 without materially affecting the space occupied by the resistance members. By increasing the effective lengths of the resistance members 16 and 18 in this manner, certain advantages are obtained which will be described in detail subsequently.

One of the legs in each of the pairs 22 and 24 is grounded. The other leg in the pair 22 is connected through a diode 29 (Figure 1) to one terminal of a secondary winding 30 in a transformer generally indicated at 32. The cathode of the diode 29 is connected to one of the legs 22 and the plate of the diode is connected to the upper terminal of the secondary winding 30 in Figure 1. Similarly, the other leg in the pair 24 is connected to the opposite terminal of the secondary winding 30 through a diode 31. The cathode of the diode 31 is connected to the leg 24 and the plate of the diode is connected to the lower terminal of the secondary winding 30 in Figure 1. The secondary winding 30 has a center tap which is grounded.

The transformer 32 has a primary winding 33 which is adapted to receive alternating voltage from a suitable source 34. The source 34 may be adapted to supply voltage throughout a complete industrial plant through outlets disposed at convenient positions in the plant. It should be appreciated that the transformer 32 may be replaced by other members which operate on a time-sharing basis. For example, the transformer 32 may be replaced by a bistable member such as a flip-flop having two stable states of operation or it may be replaced by a member such as a mechanical vibrator.

The conductive layer 12 of the diaphragm 10 is connected to a line 36 (Figures 1, 2 and 3) which extends to various receiving stations in the plant. Equipment for one of the receiving stations is shown in the drawings. This receiving station includes a thyratron tube 40 (Figure 1) having its control grid connected to the line 36. The plate of the thyratron tube 40 receives a positive voltage from the upper terminal of the secondary winding 30 in Figure 1 corresponding to the terminal which is connected to the plate of the diode 29. A connection is made from the cathode of the tube 40 to one terminal of a resistance 46, the other terminal of which is grounded. The stationary contacts of a potentiometer 48 have common connections with the terminals of the resistance 46.

Figure 1:
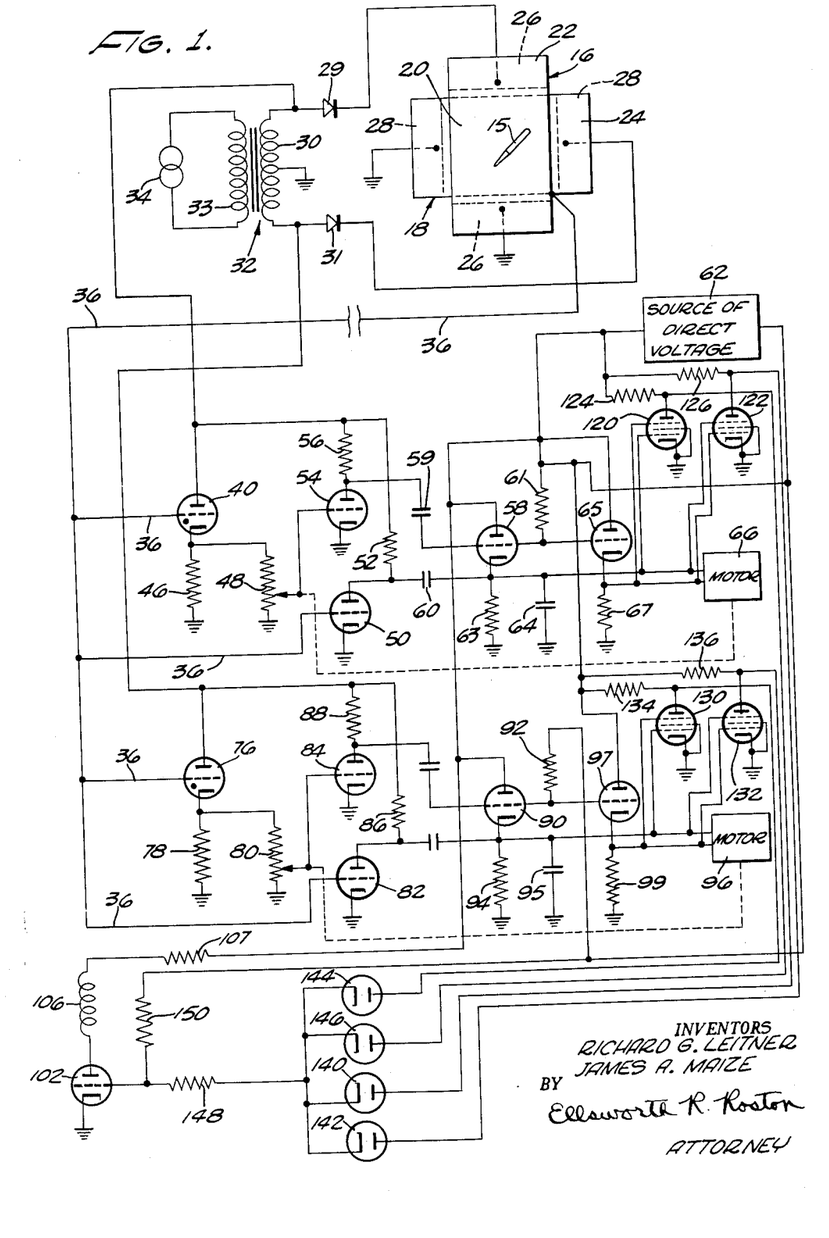
Figure 1 is a circuit diagram somewhat schematically illustrating the electrical features included in telescribing apparatus forming one embodiment of this invention.

The line 36 is not only connected to the control grid of the thyratron tube 40 but also to the control grid of a tube 50. Voltage is applied to the plate of the tube 50 through a resistance 52 from the same terminal of the secondary winding 30 as is connected to the plate of the tube 40. The cathode of the tube 50 is grounded as is the cathode of a tube 54. Voltage from the same terminal of the secondary winding 30 is also applied to the plate of the tube 54 through a resistance 56. The tube 54 and the resistance 56 have characteristics corresponding respectively to those of the tube 50 and the resistance 52. The grid of the tube 54 receives the signals appearing on the movable contact of the potentiometer 48.

The voltages on the plates of the tubes 50 and 54 are respectively applied to the grid and the cathode of a tube 58 through suitable coupling capacitances 59 and 60. The grid of the tube 58 is normally biased to a state of moderate conductivity by a resistance 61 connected between the grid of the tube and a source 62 of direct potential. A resistance 63 and a capacitance 64 are connected in parallel between the cathode of the tube 58 and ground. A connection is made from the plate of the tube 58 to the source 62 of direct voltage.

Figure 4:
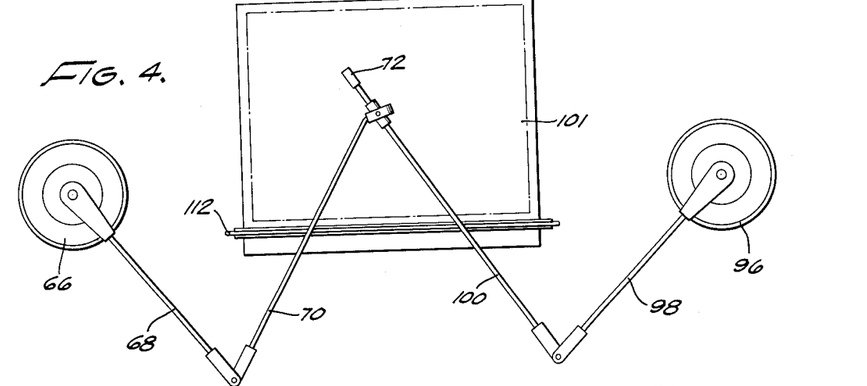
Figure 4 is a plan view somewhat schematically illustrating the construction and relative disposition of certain members operative by the circuit shown in Figure 1.

The voltage on the cathode of the tube 58 is introduced to a motor 66 illustrated in block form in Figure 1 and somewhat schematically illustrated in Figure 4. The motor is of a differential type such that it does not operate upon the introduction of voltage of a particular potential and rotates in opposite directions when the voltage is respectively above or below this potential. The particular potential may be obtained by the operation of a tube 65 and a resistance 67 having characteristics corresponding substantially to those of the tube 58 and the resistance 63, respectively. The tube 65 receives from the source 62 potentials on its plate and grid corresponding to the potentials applied to the plate and grid of the tube 58. The resistance 67 is connected between the cathode of the tube 65 and ground.

The motor 66 is mechanically coupled to the movable contact of the potentiometer 48 (as indicated by broken lines in Figure 1) and also to a linkage 68 (Figure 4) pivotably coupled to a second linkage 70. A stylus 72 (Figure 5) is movable with the linkage 70 at the end of the linkage opposite to the common terminal between the linkages 68 and 70. The linkages 68 and 70 and the stylus 72 may be disposed relative to one another and to the motor 66 in a manner similar to that disclosed in Patent No. 2,355,087 issued August 8, 1954 to Wallace A. Lauder et al.

The output voltages on the line 36 are also introduced to the grid of a thyratron tube 76 (Figure 1) corresponding to the tube 40. A resistance 78 and a potentiometer 80 are connected to the cathode of the tube 76 in a manner similar to the connection of the resistance 46 and the potentiometer 48 to the cathode of the tube 40. The plate of the thyratron tube 76 receives the voltage on the lower terminal of the secondary winding 30 in Figure 1 corresponding to the terminal in the secondary winding which is connected to the plate of the diode 31.

The voltages on the output line 36 and on the movable contact of the potentiometer 80 are respectively applied to the grids of a pair of tubes 82 and 84 corresponding to the tubes 50 and 54. The plates of the tubes 82 and 84 respectively receive voltages through a pair of resistances 86 and 88 from the same terminal in the secondary winding 30 as the plate of the tube 76. The resistances 86 and 88 have values substantially equal to those of the resistances 52 and 56.

The voltages on the plates of the tubes 84 and 82 are respectively applied through suitable coupling capacitances to the grid and cathode of a tube 90 corresponding to the tube 58. The grid of the tube 90 is biased by a resistance 92 with a potential similar to the bias on the grid of the tube 58. A direct voltage of positive polarity is introduced from the source 62 to the plate of the tube 90. The cathode of the tube 90 is connected to first terminals of a resistance 94 and a capacitance 95 having their other terminals grounded. The resistance 94 and the capacitance 95 respectively correspond in value to the resistance 63 and the capacitance 64.

The voltage on the cathode of the tube 90 is also introduced to a differential motor 96 corresponding to the motor 66. The motor 96 is indicated in block form in Figure 1 and somewhat schematically in Figure 4. The motor 96 is biased so as not to be operative upon a particular potential on the cathode of the tube 90 and so as to rotate in opposite directions upon variations in potential above or below the particular value. This may be accomplished by a tube 97 and a resistance 99 having characteristics respectively corresponding to the tube 90 and the resistance 94. The grid and plate of the tube 97 receive potentials corresponding to those respectively applied to the grid and plate of the tube 90. The resistance 99 is connected between the cathode of the tube 97 and ground.

The movable contact of the potentiometer 80 is coupled to the motor 96 (as indicated by broken lines in Figure 1) for pivotal movement in accordance with the operation of the motor. A linkage 98 (Figure 4) is also coupled at one end to the motor 96 for pivotal movement with the motor. At its other end, the linkage 98 is coupled to one end of a linkage 100. The other end of the linkage 100 is associated with the stylus 72 to produce a movement of the stylus in accordance with the movements of the linkage. The linkages 98 and 100 are so related to the linkages 68 and 70 as to produce movements of the stylus 72 in a pair of transverse directions corresponding to the relative directions of the resistance members 16 and 18.

Figure 5:
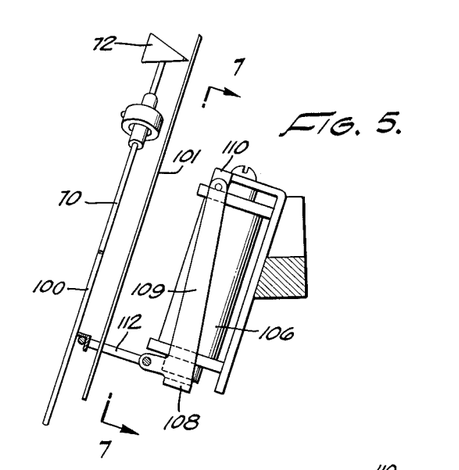
Figure 5 is a sectional view somewhat schematically illustrating the construction and relative disposition of other members controlled by the operation of the circuit shown in Figure 1 and includes a solenoid also shown in Figure 1.
Figure 6:
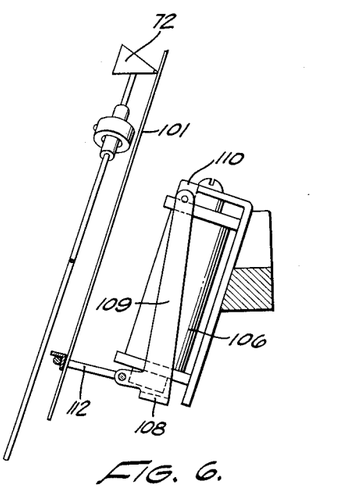
Figure 6 is a view similar to that shown in Figure 5 and illustrates the relative disposition of the members shown in Figure 5 when the solenoid is not energized.
Figure 7:
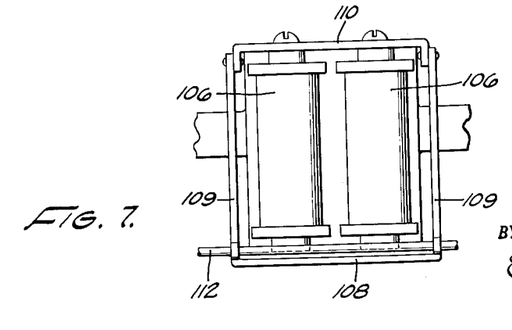
Figure 7 is a sectional view substantially on the line 7—7 of Figure 5 and illustrates in further detail the construction of the solenoid shown in Figures 1, 5 and 6.

Apparatus is included for controlling the pivotal movement of the stylus 72 into contact with a sheet of paper 101 (Figures 4, 5 and 6) at the receiving station when a message is being written by the transmitting stylus 15. This apparatus includes a tube 102 in Figure 1. The cathode of the tube 102 is grounded and the plate of the tube is connected to one terminal of a solenoid 106. The other terminal of the solenoid has a positive potential applied to it through a resistance 107 from the source 62 of direct voltage. The solenoid 106 is disposed in an inclined plane as shown in Figures 5, 6 and 7 and may be formed from a pair of parallel coils as shown in these figures.

An armature 108 is associated with the solenoid 106. The armature is supported by arms 109 from a mounting bracket 110 for pivotal movement relative to the bracket. The armature 108 extends from the bracket 110 in oblique relationship to the plane defined by the axes of the two coils forming the solenoid 106. This offset relationship between the armature 108 and the solenoid 106 may be best seen in Figure 5. The purpose of this relationship will be described in detail subsequently. A support member 112 is carried by the arms 109. The support member 112 has a hollow rectangular configuration such that one arm of the rectangle is positioned relatively close to the paper 101 on the same side of the paper as the stylus 72.

The member 112 supports the stylus 72 to control the positioning of the stylus relative to the paper 101. When the solenoid 106 is not energized, the action of gravity causes the arms 109 to pivot in a counterclockwise direction and to move the support member 112 with it. Since the stylus 72 follows the movements of the support member 112, it moves into a position contacting the paper 101.

The solenoid 106 becomes energized by the operation of certain electrical components shown in Figure 1. These components include a pair of pentodes 120 and 122 each having their cathodes and screen grids grounded. Connections are respectively made from the cathodes of the tubes 58 and 65 to the control grid and suppressor grid of the tube 120 and to the suppressor grid and control grid of the tube 122. Resistances 124 and 126 are respectively connected between the plates of the tubes 120 and 122 and the positive terminal of the voltage source 62.

In like manner, the operation of a pair of tubes 130 and 132 is controlled by the voltages on the cathodes of the tubes 90 and 97. The control and suppressor grids of the tube 130 respectively receive the voltages on the cathodes of the tubes 90 and 97. Similarly, the voltages on the cathodes of the tubes 90 and 97 are respectively introduced to the suppressor and control grids of the tube 132. The cathodes and screen grids of the tubes 130 and 132 may be grounded. The plates of the tubes 130 and 132 have positive voltages applied to them through resistances 134 and 136, respectively, from the positive terminal of the voltage source 62.

The voltages on the plates of the tubes 120, 122, 130 and 132 are respectively applied to the plates of diodes 140, 142, 144 and 146. The cathodes of the diodes 140, 142, 144 and 146 have a common connection with one terminal of a resistance 148, the other terminal of which is connected to the grid of the tube 102. The grid of the tube 102 is normally biased by a resistance 150 to the line of negative potential from the source 62 so as to maintain the tube non-conductive.

When the stylus 15 (Figures 1 and 2) is pressed against the paper 11 (Figures 2 and 3), it depresses the conductive layer 12 of the diaphragm 10 into engagement with the central portion 20 of the resistance members 16 and 18. The diaphragm 10 is depressed into contact with the resistance members 16 and 18 at a position directly below the position at which the stylus 15 engages the paper 11. The contact between the conductive layer 12 and the central portion 20 of the resistance members 16 and 18 is maintained until the pressure against the stylus 15 is released. At such a time, the diaphragm 10 instantaneously moves away from the resistance members 16 and 18 because of the resilient characteristics of the diaphragm and the taut disposition of the diaphragm through the action of the clamps 14.

The establishment of an electrical continuity between the conductive layer 12 and the resistance members 16 and 18 causes voltages to be produced on the output line 36. The voltages produced on the output line 36 are dependent upon the position of contact between the conductive layer 12 and the resistance members 16 and 18. This results from the fact that the voltage applied to one end of each resistance member decreases on a linear basis with progressive distances along the member and reaches ground potential at the other end of the resistance member. Furthermore, since hardly any voltage drop is produced in the conductive layer 12, the voltage produced at the position of contact between the conductive layer and the resistance member is introduced to the output line 36.

Voltages representing the position of contact between the conductive layer 12 and the resistance member 16 are produced during positive half cycles of line voltage from the source 34. This results from the introduction of a positive voltage to the resistance member 16 from the secondary winding 30. The positive voltage is introduced through the diode 29, which is able to pass the voltage because of its particular manner of connection in the circuit. However, in the negative half cycles of voltage, negative voltages cannot pass from the secondary winding 30 through the diode 29 to the resistance member 16. This causes the resistance member 16 to receive voltages only in alternate half cycles.

In the negative half cycles of voltage from the source 34, a positive voltage is introduced to the plate of the diode 31. This voltage passes through the diode 31 to the resistance member 18 and causes a proportionate voltage to be produced at the position of contact between the conductive layer 12 and the resistance member. During the other half cycles, a negative voltage is introduced to the plate of the diode 31 and is prevented by the diode from passing to the resistance member 18.

In this way, voltages are introduced to the resistance members 16 and 18 on a time-sharing basis. This causes voltages to be produced on an alternate basis on the output line 36. In this alternate relationship, one voltage represents the proportionate distance long the resistance member 16 at which the conductive layer 12 contacts the resistance member. The other voltage represents the proportionate distance along the resistance member 18 at which the conductive layer 12 contacts the resistance member.

The signals on the output line 36 are introduced to the grid of the thyratron tube 40 in Figure 1. These signals cause the tube 40 to become triggered into a state of conduction. The tube 40 becomes triggered into a state of conduction as long as the stylus 15 is being pressed against the paper 11. This results from the fact that a voltage having a sufficient amplitude is produced at any position at which the conductive layer 12 may be contacting the resistance member 16. The reason for this is that the portion 20 is disposed along only a moderate length of the resistance members 16 and 18 and at a central position along these members.

The tube 40 can become conductive only in the positive half cycles of voltage from the transformer 32 because of the connection of the plate of the tube to the secondary winding 30. When the tube becomes conductive in a positive half cycle of voltage from the transformer 32, it becomes cut off in the next half cycle. This results from the introduction of a negative voltage from the secondary winding 30 to the plate of the tube 40.

The thyratron tube 40 acts somewhat as a switch. The tube 40 acts as a switch because its impedance becomes low when it becomes conductive. This causes the current flowing through a circuit including the secondary winding 30, the tube 40 and the resistance 46 to be limited essentially only by the value of the resistance. For this reason, practically all of the voltage from the secondary winding 30 is developed across the resistance 46 in the positive half cycles of voltage from the source 34. A portion of this voltage is in turn produced at the movable contact of the potentiometer 48. The voltage produced on the movable contact of the potentiometer 48 is dependent upon the position to which the movable contact has been driven by the motor 66.

The voltage on the movable contact of the potentiometer 48 is introduced to the grid of the tube 54. This voltage causes the tube 54 to become conductive and current to flow through a circuit including the secondary winding 30, the resistance 56 and the tube 54. Since the conductivity of the tube 54 is controlled by the positive bias on the grid of the tube, a voltage proportional to the grid bias is developed on the plate of the tube. This voltage is introduced through the coupling capacitance 59 to the grid of the tube 58. By including the coupling capacitance 59, only the alternating voltage produced on the plate of the tube 54 can be introduced to the grid of the tube 58.

The voltage on the output line 36 is also introduced to the grid of the tube 50. This tube can become conductive only in the positive half cycles of voltage from the transformer 32 because of the introduction of alternating voltage from the secondary winding 30 to the plate of the tube. In these half cycles, the voltage developed on the conductive layer 12 by contact with resistance member 16 is introduced through the line 36 to the grid of the tube 50. This voltage controls the conductivity of the tube 50 and causes a proportionate voltage to be produced on the plate of the tube. The voltage on the plate of the tube 50 is introduced through the coupling capacitance 60 to the cathode of the tube 58. In this way, only the alternating voltage produced on the plate of the tube 50 can be applied to the cathode of the tube 58.

As previously described, the tube 58 is normally biased so as to be moderately conductive. Since voltages are respectively introduced to the grid and cathode of the tube 58 from the plates of the tubes 54 and 50, the conductivity of the tube 58 becomes altered by any difference in the voltage from the tubes 50 and 54. When the voltage from the tube 54 exceeds the voltage from the tube 50, the flow of current through the tube 58 increases and causes the voltage across the resistance 63 to increase. In like manner, the flow of current through the tube 58 decreases and produces a corresponding decrease in the voltage across the resistance 63 when the voltage from the tube 54 is less than the voltage from the tube 50. In this way, the voltage produced across the resistance 63 reflects the amplitude and polarity of any differences in the voltages on the plates of the tubes 50 and 54.

The voltage produced across the resistance 63 is rectified by the operation of the capacitance 64 since the capacitance stores a charge dependent upon the flow of current through the tube 58. The voltage is then introduced to the motor 66 to affect the operation of the motor. The motor 66 does not operate for a median voltage developed across the resistance 63 by a normal bias between the grid and cathode of the tube 58. This results from the fact that the median voltage is also produced across the resistance 67 by the flow of current through the tube 65 and the resistance 67. The median voltage is produced across the resistance 67 because the bias applied to the grid of the tube 65 is the same as that applied to the grid of the tube 58 and the tubes 58 and 65 have similar characteristics.

When the voltage across the resistance 63 increases from the median value, the motor 66 operates in one direction and drives the linkage 68 (Figure 4) in a particular direction such as a counterclockwise direction. The linkage 68 in turn drives the linkage 70 to move the stylus 72 in a direction corresponding to the axis established by the resistance member 16. In like manner, the motor 66 rotates in an opposite direction upon a decrease in the voltage across the resistance 63 from the median value. The rotation of the motor 66 produces a pivotal movement of the linkage 68 in an opposite direction such as a clockwise direction. The linkage 68 in turn drives the linkage 70 to move the stylus 72 in a direction opposite to the movement of the stylus as described above.

As described in the previous paragraphs, the motor 66 drives the stylus 72 in accordance with any differences in voltages on the output line 36 and on the movable contact of the potentiometer 48. The motor 66 not only drives the stylus 72 but also drives the movable contact of the potentiometer 48. The motor drives the movable contact of the potentiometer 48 in a direction to reduce any differences in the voltages on the output line 36 and the movable contact of the potentiometer. In this way, servo techniques are used to position the stylus 72 in accordance with the signals on the output line 36.

In like manner, the voltage on the output line 36 is introduced to the grid of the gas-filled tube 76 in Figure 1. Only the signals from the resistance member 18 are able to pass through the tube 76. This results from the particular connection from the secondary winding 30 to the plate of the tube 76. Because of this particular connection, the tube 76 can conduct current only in the half cycles of voltage from the transformer 32 in which a positive voltage is produced in the lower half of the secondary winding 30 in Figure 1. When the tube 76 becomes conductive, the voltage from the secondary winding 30 is produced across the resistance 78 and the potentiometer 80. This causes a proportionate voltage to be developed on the movable contact of the potentiometer 80 in accordance with the position to which the movable contact has been driven by the motor 96.

The voltage on the movable contact of the potentiometer 80 controls the flow of current through the tube 84 and causes a corresponding voltage to be produced on the plate of the tube. Similarly, the voltage introduced to the output line 36 from the resistance member 18 controls the flow of current through the tube 82 and causes a corresponding voltage to be produced on the plate of the tube. The difference in the voltages on the plates of the tubes 82 and 84 is applied between the cathode and grid of the tube 90 to affect the conductivity of the latter tube. In this way, the voltage across the resistance 94 is indicative of any differences in the potentials on the output line 36 and on the movable contact of the potentiometer 80.

The voltage across the resistance 94 is rectified and smoothed in amplitude by the capacitance 95 and is introduced to the motor 96 to control the operation of the motor. The motor 96 rotates in one direction when the voltage introduced to the output line 36 from the resistance member 18 is greater than the voltage on the movable contact of the potentiometer 80. The motor 96 rotates in an opposite direction when the voltage introduced to the output line 36 from the resistance member 18 is less than the voltage on the movable contact of the potentiometer 80.

The proper operation of the motor 96 results from the action of the tube 97 and the resistance 99 in producing across the resistance a voltage substantially equal to the median voltage produced across the resistance 94. The median voltage produced across the resistance 99 is in effect subtracted from the voltage produced across the resistance 94 so that in effect only a difference voltage is introduced to the motor 96. This voltage represents any differences between the voltage from the resistance member 18 and from the movable contact of the potentiometer 80.

Upon the rotation of the motor 96, the motor drives the stylus 72 through the linkages 98 and 100 (Figure 4). The motor 96 drives the stylus 72 in a direction corresponding to the coordinate along which the resistance member 18 is disposed. The motor 96 also drives the movable contact of the potentiometer 80 in a direction to minimize any differences in the potential on the movable contact and the potential introduced to the output line 36 from the resistance member 18. By using servo techniques to control the position of the stylus 72, increased accuracies in the movement of the stylus are obtained.

The tube 102 (Figure 1) is normally cut off since the grid of the tube is negatively biased through the resistance 150 from the voltage source 62. Because of the non-conductivity of the tube 102, no current is able to flow through the solenoid 106. This prevents the solenoid 106 from actuating the armature 108 (Figures 4 and 5). This causes the arms 109 to pivot in a counterclockwise direction in accordance with the action of gravity and to carry the support member 112 in the same direction. Since the stylus 72 rests on the support member 112, it follows the movement of the support member to a position resting against the paper 101. The position of the stylus 72 in contact with the paper 101 is shown in Figure 6.

As described in the previous paragraph, the stylus 72 rests against the paper 101 in its normal positioning. Although the stylus 72 is contacting the paper 101, no marks are being made on the paper since no signals are being transmitted on the line 36 to move the stylus. The stylus 72 also contacts the paper 101 and produces marks on the paper during the time that the movements of the stylus are closely approximating the movements of the stylus 15 at the transmitting station. This will be described in detail subsequently.

When the movements of the receiving stylus are somewhat different from the movements of the transmitting stylus 15 along the axis of the resistance member 16, signals having somewhat different amplitudes are produced on the cathodes of the tubes 58 and 65 in Figure 1. The signals on the cathodes of the tubes 58 and 65 are respectively introduced to the control and suppressor grids of the tube 120 to alter the flow of current through the tube. The flow of current through the tube 120 increases when the voltage introduced to the control grid of the tube tends to increase with respect to the voltage introduced to the suppressor grid of the tube. This occurs when the stylus 72 is tending to lag behind the corresponding position of the stylus 15 in the forward movement of the styluses. Upon an increase in the flow of current through the tube 120, an increased voltage drop is produced across the resistance 124. This tends to decrease the voltage on the plate of the tube 120.

In like manner, the current through the tube 120 tends to decrease when the voltage introduced to the control grid of the tube tends to decrease with respect to the voltage on the suppressor grid. This occurs when the stylus 72 is at a greater distance from the bottom end of the resistance member 16 than the transmitting stylus 15. The decrease in current through the tube 120 causes the voltage at the plate of the tube to increase since the voltage produced across the resistance 124 tends to decrease.

The voltages on the cathodes of the tubes 58 and 65 are also introduced to the grids of the tube 122 but on a reverse basis relative to the introduction of voltages to the grids of the tube 120. Thus, the voltage on the cathode of the tube 65 is introduced to the control grid of the tube 122 and the voltage on the cathode of the tube 58 is introduced to the suppressor grid of the tube 122. This reverse relationship of connections to the tubes 120 and 122 causes the current through the tube 122 to decrease while the current through the tube 120 is increasing and vice versa. Because of the reverse relationship in the flow of current through the tubes 120 and 122, the voltage on the plate of the tube 120 increases while the voltage on the plate of the tube 122 is decreasing and vice versa.

The voltages on the plates of the tubes 120 and 122 are respectively introduced to the plates of the diodes 140 and 142. When the stylus 72 is exactly following the movements of the transmitting stylus 15 along the axis of the resistance member 16, the voltages introduced to the plates of the diodes 140 and 142 are substantially equal. These voltages pass through the plates of the diodes 140 and 142 and produce substantially equal voltages on the cathodes of the diodes.

The voltages on the cathodes of the diodes 140 and 142 are introduced through the resistance 148 to the grid of the tube 102. The voltages introduced to the grid of the tube 102 from the diodes 140 and 142 are not of sufficient amplitude to overcome the negative bias introduced to the grid of the tube from the voltage source 62. This causes the tube 102 to remain cut off such that the stylus 72 remains in contact with the paper 101. This causes the stylus to record on the paper 101 movements corresponding to those of the stylus 15.

At certain times, the voltages on the plates of the tubes 120 and 122 may become unbalanced to represent an error in the movement of the stylus 72 along the axis of the resistance member 16. For example, the voltage on the plate of the tube 120 may become greater at certain times than the voltage on the plate of the tube 122. The voltage on the plate of the tube 120 passes through the diode 140 and produces a corresponding voltage on the cathode of the diode. This voltage is introduced to the cathode of the diode 142 to prevent the voltage on the plate of the diode from passing through the diode.

When the voltage on the cathodes of the diodes 140 and 142 increases sufficiently, it overcomes the negative bias on the grid of the tube 102 and produces a flow of current through the tube. This current also flows through the solenoid 106 and energizes the solenoid such that the armature 108 becomes actuated into the position shown in Figure 5. The actuation of the solenoid 106 produces a pivotal movement of the arms 109 in a clockwise direction. The arms 109 carry the support member 112, which moves the stylus 72 away from the paper 101.

In this way, the stylus 72 cannot record any marks on the paper 101 while it is not accurately following the movements of the transmitting stylus 15. The accuracy in the movements of the stylus 72 required to produce a written record on the paper 101 can be adjusted by varying the negative bias on the grid of the tube 102 and the median voltage applied to the grid from the diodes 140 and 142 in Figure 1. This provides a control in the amount of error which can be tolerated in the movements of the stylus 72.

Similarly, the tubes 130 and 132 receive the voltages on the cathodes of the tubes 90 and 97 on a reverse basis relative to each other. This causes the voltage on the plate of the tube 130 to decrease and the voltage on the plate of the tube 132 to increase or vice versa when the voltages on the cathodes of the tubes 90 and 97 become unbalanced. The rise in the voltage on the plate of one of the tubes 130 and 132 causes an increased voltage to pass through one of the diodes 144 and 146 to the grid of the tube 102.

When the rise in voltage on the grid of the tube 102 is sufficiently great, it causes the tube to become conductive and the solenoid 106 to become energized. By energizing the solenoid 106, the stylus 72 becomes withdrawn from the paper 101 in a manner similar to that described above. This prevents any marks from being recorded on the paper 101 when the stylus 72 is not following the stylus 15 with sufficient accuracy along the axis of the resistance member 18.

Figure 8:
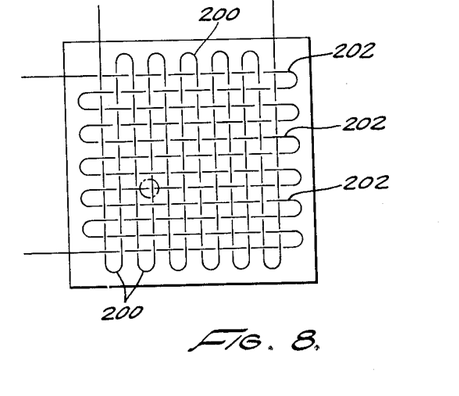
Figure 8 is a plan view somewhat schematically illustrating certain members which constitute a modified form of the invention and which are adapted to replace the members shown in Figures 2 and 3.
Figure 9:
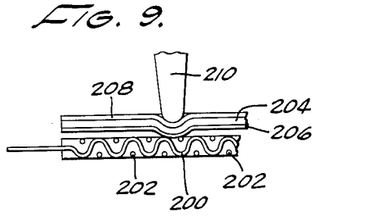
Figure 9 is an enlarged, fragmentary elevational view illustrating the relative disposition of the members shown in Figure 8 when the members are in their operative relationship at a time when a message is being transcribed.

Modified forms of resistance members are shown in Figures 8 and 9. These resistance members are formed by a pair of wires extending in a sinuous path in a pair of directions corresponding to the co-ordinates of the telescribing system. For example, a first wire 200 is coiled into a plurality of turns disposed at spaced intervals along an axis corresponding to that of the resistance member 16 in Figures 1 to 3, inclusive. Similarly, a second wire 202 is folded back upon itself to form a plurality of turns extending at spaced intervals in a direction corresponding to that of the resistance member 18 in Figures 1 to 3, inclusive. The wires 200 and 202 are disposed in an interlaced relationship corresponding to the warp and woof of a fabric. This may be seen best in Figure 9.

A diaphragm 204 having a conductive layer 206 on its lower face is disposed above the wires 200 and 202 in contiguous relationship to the wires. The diaphragm 204 is adapted to support a paper 208 on which a message may be written by a stylus 210 corresponding to the stylus 15 in Figures 1 and 2. When the stylus 210 is depressed, it forces the diaphragm 204 downwardly so that the conductive layer 206 contacts the wires 200 and 202 in a manner similar to that shown in Figure 9. This produces at the position of contact voltages dependent upon the relative distance of this position along the wires 200 and 202.

The telescribing system described above has certain important advantages. At a transmitting station, the system produces voltages representing the position of a stylus without requiring that any electrical connections be made to the stylus. The system produces such voltages by using a flexible diaphragm such as the diaphragm 10 (Figures 1 and 2) and a pair of resistance members such as the members 16 and 18. The system produces "workable" voltages at any position at which the stylus 15 contacts the paper 11. This results from the fact that the central portion 20 of the resistance members 16 and 18 is disposed between end portions 22 and 24, which are in turn disposed in folded relationship to increase their effective lengths.

By centrally disposing the portion 20 and folding the portions 22 and 24, substantial voltages are produced at any position in the central portion. These voltages are "workable" since they have a sufficient amplitude to produce a flow of current through any tube to which they are introduced in Figure 1. This is true even after the voltages have passed through output lines 36 of substantial length to the various receiving stations associated with a transmitting station.

The system described above has certain other advantages. It produces a pair of voltages on a time-sharing basis for introduction to the output line 36. The system produces the voltages on a time-sharing basis by the use of relatively simple techniques such as a center-tapped transformer or a flip-flop. The system also decodes the time-shared voltages at the receiving station on a relatively simple basis as by using the voltages from the center-tapped transformer to control the passage of signals through intermediate stages at the receiving station. The use of time-sharing techniques at the transmitting and receiving stations is advantageous since direct voltages can be produced to represent the positioning of the stylus. Producing direct voltages is desirable because of the relatively small number of stages required and the simplicity of these stages.

The circuit described above is advantageous for other reasons. It uses servo techniques to control the positioning of the stylus such as the stylus 72 at each receiving station. It uses servo techniques on a simple basis such as a comparison between the amplitudes of a pair of voltages to control the positioning of the stylus in a particular direction. The comparison can be made on a convenient basis without any necessity for regulating the supply voltages at the receiving station. The reason is that the amplitude of each voltage in the pair is affected in a similar manner by changes in the amplitude of the supply voltage. On the basis of any differences in the amplitudes of the voltages in the pair, a motor is operated to vary the position of the stylus and to produce a corresponding variation in the amplitude of one of the voltages in the pair. The variation is made in a direction to make this voltage equal the other voltage in the pair.

In addition to the advantages described above, the apparatus constituting this invention has another important advantage. It prevents any marks from being recorded on the paper at each receiving station unless the marks represent an accurate disposition of the stylus at the receiving station relative to the disposition of the stylus at the transmitting station. This is especially important when a message is first being transcribed. This results from the fact that the stylus at the transmitting station is first generally moved to an intermediate position on the paper and is then depressed into contact with the paper so as to begin transcribing a message. If the receiving stylus were to record immediately, a long line might be scratched by the stylus across the paper before the receiving stylus reached a position corresponding to the position of the transmitting stylus.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination with a stylus at a transmitting station, means for providing first signal indications representing displacements of the transmitting stylus along a first axis, means for providing second signal indications representing displacements of the transmitting stylus along a second axis, a stylus at a receiving station, means including first servo means for providing displacements of the receiving stylus along the first axis in accordance with the characteristics of the first signal indications, means including second servo means for providing displacements of the receiving stylus along the second axis in accordance with the characteristics of the second signal indications, and means including the servo means for preventing any recordation of the disposition of the receiving stylus for differences greater than a particular value in the dipositions of the transmitting and receiving styluses.

2. In combination with a stylus at a transmitting station, means for providing first signal indications representing displacements of the transmitting stylus along a first axis, means for providing signal indications representing displacements of the stylus along a second axis transverse to the first axis, a stylus at a receiving station, means for providing displacements of the receiving stylus along the first axis in accordance with the movements of the transmitting stylus along this axis, means for providing displacements of the receiving stylus along the second axis in accordance with the movements of the transmitting stylus along this axis, and means for providing a recordation of the disposition of the receiving stylus only when the disposition of the receiving stylus corresponds to the disposition of the transmitting stylus within particular limits.

3. In combination with a stylus at a transmitting station, means for providing first signal indications representing the displacement of the stylus along a first axis, means for providing second signal indications representing the displacement of the stylus along a second axis transverse to the first axis, a stylus at a receiving station for producing a record on a paper, means for producing a displacement of the receiving stylus along the first axis in accordance with the characteristics of the first signal indications, means for producing a displacement of the receiving stylus along the second axis in accordance with the characteristics of the second signal indications, a magnetic member for controlling the positioning of the receiving stylus relative to the paper, means for normally maintaining the receiving stylus in a position for recording on the paper the displacement of the stylus along the first and second axes, and means for energizing the magnetic member for differences greater than a particular value in the dispositions of the transmitting and receiving stylus along the first and second axes to prevent any recordation on the paper of the position of the receiving stylus.

4. In combination with a stylus at a transmitting station, means at the transmitting station for providing on a time-sharing basis signal indications representing the displacement of the stylus along a pair of transverse axes and without any connections to the stylus, a stylus at a receiving station, means at the receiving station for decoding the signal indications to provide a delineation between the signal indications representing the displacement of the transmitting stylus along one axis and the signal indications representing the displacement of the stylus along the second axis, means including first servo means for providing a displacement of the receiving stylus along the first axis in accordance with the signal indications representing the displacement of the transmitting stylus along that axis, means including second servo means for providing a displacement of the receiving stylus along the second axis in accordance with the signal indications representing the displacement of the transmitting stylus along that axis, and means responsive to the servo means for preventing the receiving stylus from making any recordations when the receiving stylus is not following the displacement of the transmitting stylus within particular limits.

5. In combination, a first stylus movable over an area defined by distances in a pair of transverse directions, means for alternately providing first and second output voltages having amplitudes related to the positioning of the stylus at any instant, a second stylus disposed at a receiving station removed from the first stylus, a first motor for driving the second stylus in a first one of the transverse directions, a second motor for driving the second stylus in the second of the transverse directions, means including means driven by the first motor for providing first comparison voltages in synchronization with the first output voltages and representing the distance in the first direction through which the second stylus is driven by the motor relative to the displacement of the first stylus in the first direction, means including means driven by the motor for providing second comparison voltages in synchronization with the second output voltages and representing the distance in the second direction through which the second stylus is driven by the motor relative to the displacement of the first stylus in the second direction, means for producing first error voltages having amplitudes representing any differences between the first output and comparison voltages and for introducing the error voltages to the first motor to produce a movement of the second stylus in a direction for reducing the amplitude of the error voltage, means for producing second error voltages having amplitudes representing any differences between the second output and comparison voltages and for introducing the error voltages to the second motor to produce a movement of the second stylus in a direction for reducing the amplitude of the error voltage, and means for controlling the positioning of the second stylus relative to a paper to produce on the paper marks representing the positioning of the stylus only upon the production of first and second error voltages having amplitudes less than a particular value.

6. In combination with a stylus at a transmitting station, means for providing first signal indications representing displacements of the transmitting stylus, a stylus at a receiving station, means including servo means for providing displacements of the receiving stylus in accordance with the characteristics of the signal indications representing the displacements of the transmitting stylus, and means including the servo means for preventing any recordation of the disposition of the receiving stylus for differences greater than a particular value in the dispositions of the transmitting and receiving styluses.

7. In combination with a stylus at a transmitting station, means for providing first signal indications representing displacements of the transmitting stylus, a stylus at a receiving station, means for providing displacements of the receiving stylus in accordance with the movements of the transmitting stylus, and means for recording the disposition of the receiving stylus only when the disposition of the receiving stylus corresponds to the disposition of the transmitting stylus within particular limits.

8. In combination for use with a stylus movable to different positions in a particular area defined by a pair of transverse directions, a first resistance member disposed in one of the transverse directions and having at progressive positions in this direction a resistance value related to the position, a second resistance member disposed in the other one of the transverse directions and having at progressive positions in this direction a resistance value related to the position, a flexible diaphragm disposed in contiguous relationship to the first and second resistance member for movement against the resistance member upon its depression by the stylus, a conductive layer between the flexible diaphragm and the resistance members for contact with the resistance members upon the depression of the stylus, the conductive layer having a resistivity considerably less than that provided by the resistance members, an output line in contact with the conductive layer, and means for applying voltages across the resistance members to obtain at the output line voltages dependent upon the position at which the stylus presses the conductive layer into contact with the members.

9. In combination for use with a stylus movable to different positions in a particular area defined by a pair of transverse directions, a flexible diaphragm, a first resistance member extending in the first transverse direction and having a progressively increasing resistance value with progressive increases in distance in that direction, a second resistance member extending in the second transverse direction and having a progressively increasing resistance value with progressive increases in distance in that direction, a conductive coating on the surface of the diaphragm contiguous to the resistance members for forming an electrical current path with the resistance members upon depression by the stylus, the conductive coating having a resistance value considerably less than the resistance values provided by the first and second resistance members, an output lead extending from the conductive coating, means for applying direct current voltages across the resistance members to obtain at the output lead a first potential related to the position along the first resistance member at which the stylus is depressed and to obtain at the output lead a second potential related to the position along the second resistance member at which the stylus is depressed.

10. In a combination as set forth in claim 9, means including the voltage means for alternately applying the voltage across the first and second resistance members to obtain alternately the first and second output potentials.

11. In a combination as set forth in claim 9, the first and second resistance members being folded at their ends to increase the effective lengths of the members without increasing the particular area defined by the pair of transverse directions.

References Cited in the file of this patent

UNITED STATES PATENTS

| | | |
|---|---|---|
| 1,314,617 | Tiffany | Sept. 2, 1919 |
| 2,224,709 | Vehling | Dec. 10, 1940 |
| 2,269,599 | Moodey | Jan. 13, 1942 |
| 2,462,904 | Rosen | Mar. 1, 1949 |
| 2,565,612 | Levin | Aug. 28, 1951 |
| 2,570,739 | Wild | Oct. 9, 1951 |
| 2,583,535 | Adler | Jan. 29, 1952 |
| 2,583,720 | Adler | Jan. 29, 1952 |
| 2,623,943 | Adler | Dec. 30, 1952 |
| 2,649,503 | Adler | Aug. 18, 1953 |
| 2,704,305 | McLaughlin | Mar. 15, 1955 |
| 2,900,446 | McLaughlin | Aug. 18, 1959 |

FOREIGN PATENTS

| | | |
|---|---|---|
| 588,043 | Great Britain | May 13, 1947 |
| 326,089 | Germany | Sept. 3, 1918 |